United States Patent [19]
Palmer

[11] Patent Number: 4,778,213
[45] Date of Patent: Oct. 18, 1988

[54] EXTENDABLE VEHICLE TAILGATE ASSEMBLY

[76] Inventor: Randall J. Palmer, 341 Valley View Dr., Paradise, Calif. 95969

[21] Appl. No.: 116,059

[22] Filed: Oct. 29, 1987

Related U.S. Application Data

[63] Continuation-in-part of Ser. No. 932,629, Nov. 20, 1986, abandoned.

[51] Int. Cl.⁴ ............................................. B62D 33/08
[52] U.S. Cl. .................................... 296/26; 296/37.6; 296/57.1; 224/42.42
[58] Field of Search ...................... 296/26, 37.6, 57 R; 224/42.42 R

[56] References Cited

U.S. PATENT DOCUMENTS

| | | | |
|---|---|---|---|
| 4,023,850 | 5/1977 | Tillery | 296/26 |
| 4,136,905 | 1/1979 | Morgan | 296/57 R |
| 4,472,639 | 9/1984 | Bianchi | 296/26 |
| 4,531,773 | 7/1985 | Smith | 296/26 |

Primary Examiner—Robert R. Song
Attorney, Agent, or Firm—William P. Green

[57] ABSTRACT

An extension for a truck or other vehicle having a tailgate, with the extension including two side panels to be attached to the main tailgate of the vehicle in positions parallel to one another and for swinging movement with the main tailgate between its open and closed positions, an auxiliary tailgate which projects upwardly from a rear edge of the main tailgate in the open position of the main tailgate, and hinge structure mounting the auxiliary tailgate for swinging movement relative to the main tailgate and relative to the side panels, while the side panels remain generally parallel to one another, and from an active position of the auxiliary tailgate essentially perpendicular to the main tailgate to a retracted position essentially parallel to and essentially adjacent the main tailgate.

38 Claims, 4 Drawing Sheets

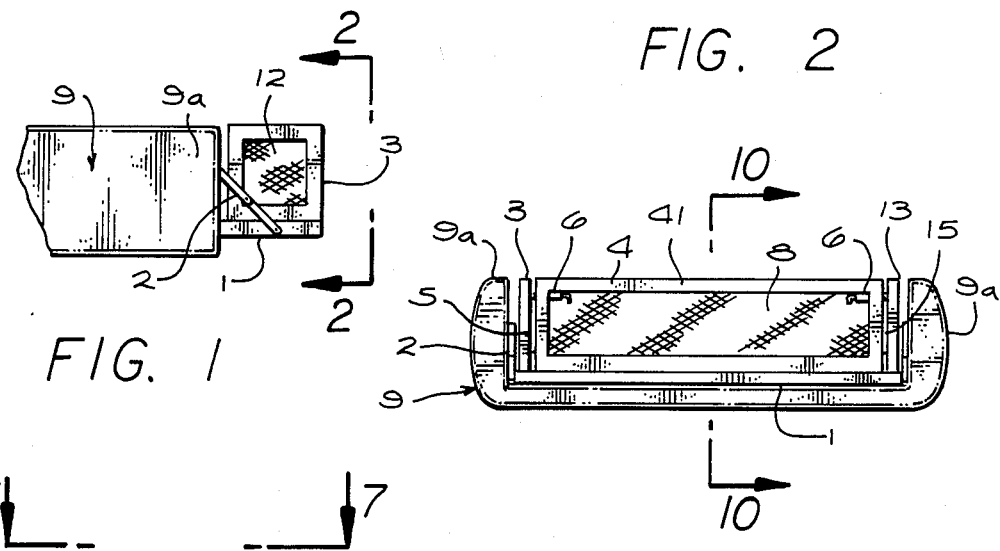
FIG. 1
FIG. 2
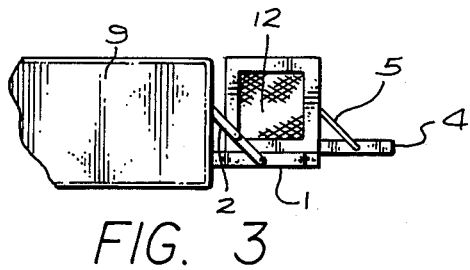
FIG. 3
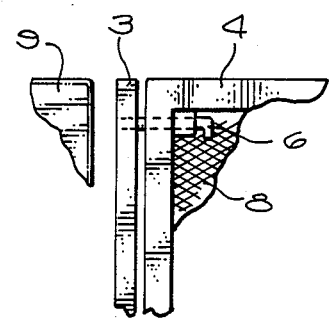
FIG. 4
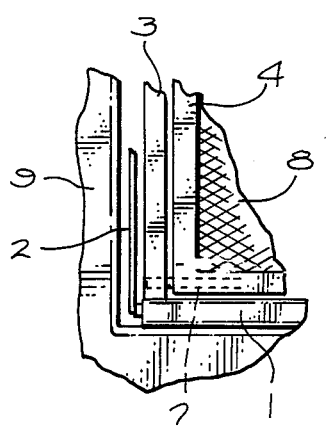
FIG. 5
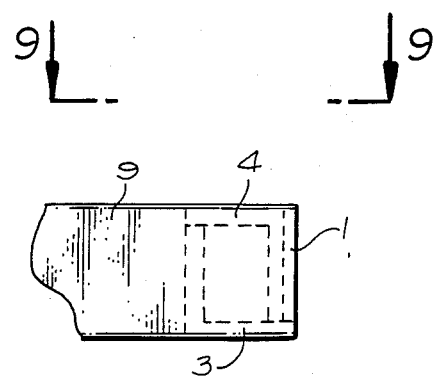
FIG. 6

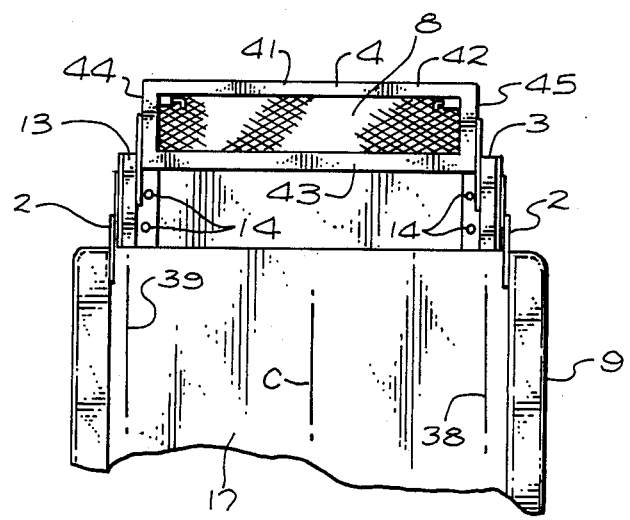
FIG. 7
FIG. 8
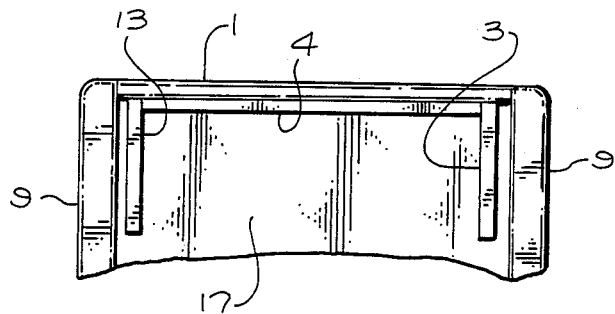
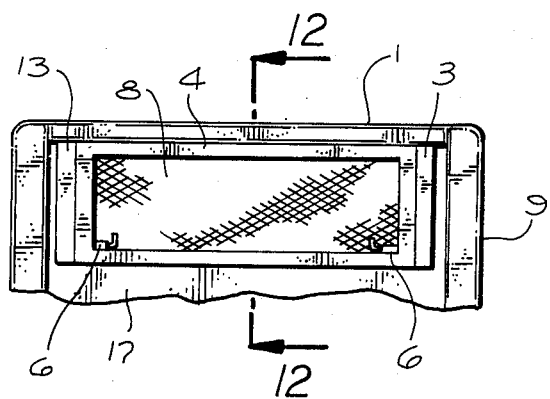
FIG. 9

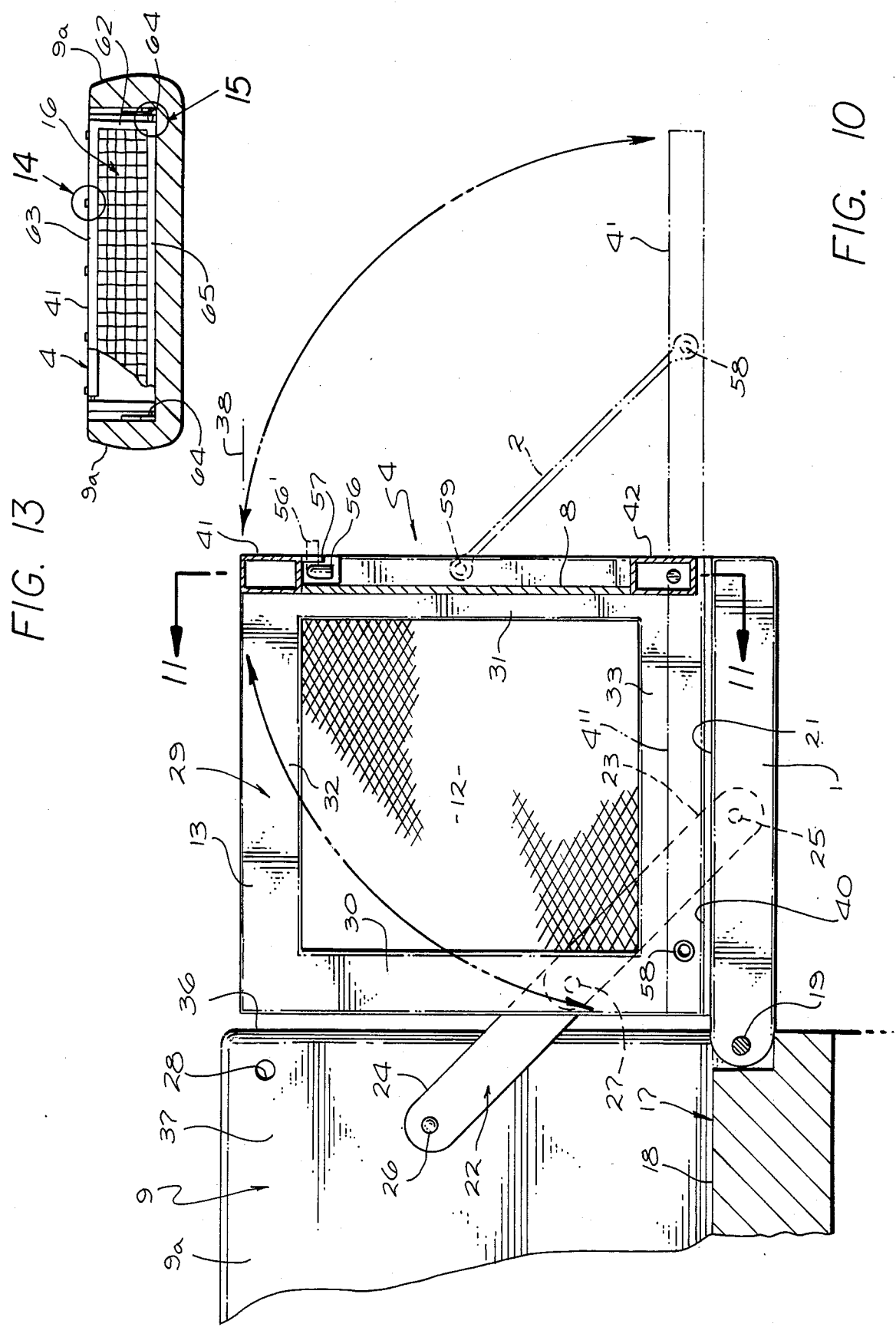

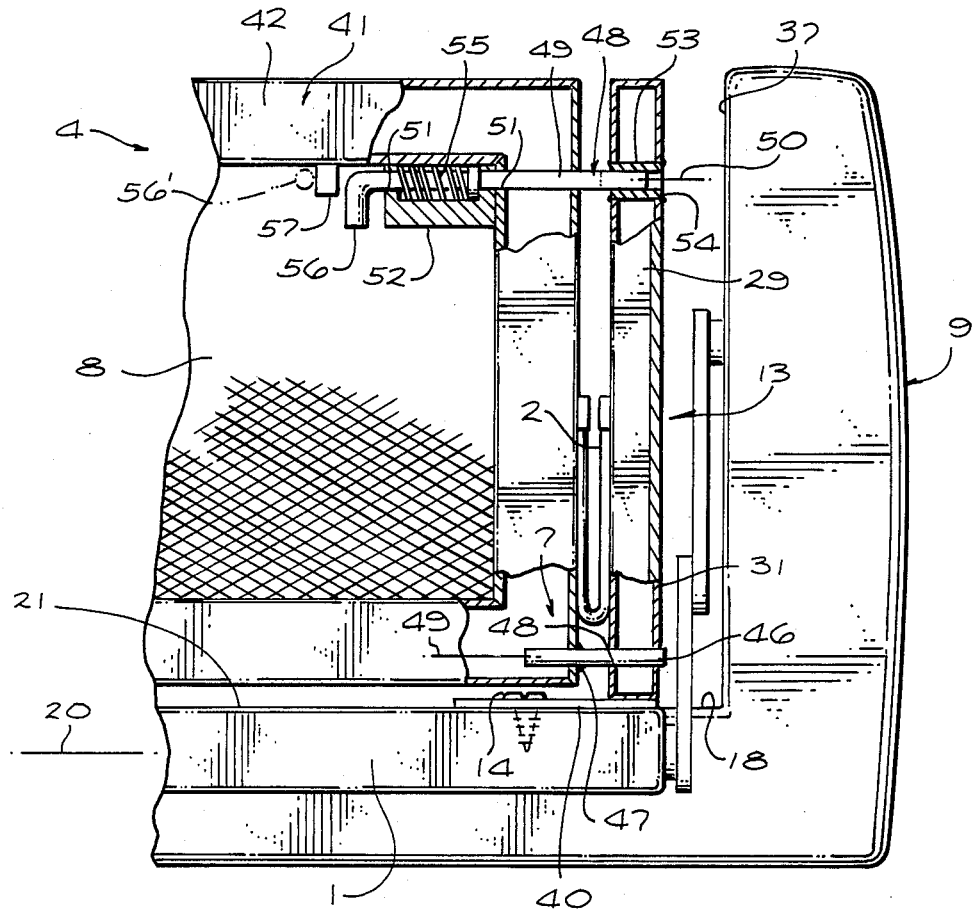
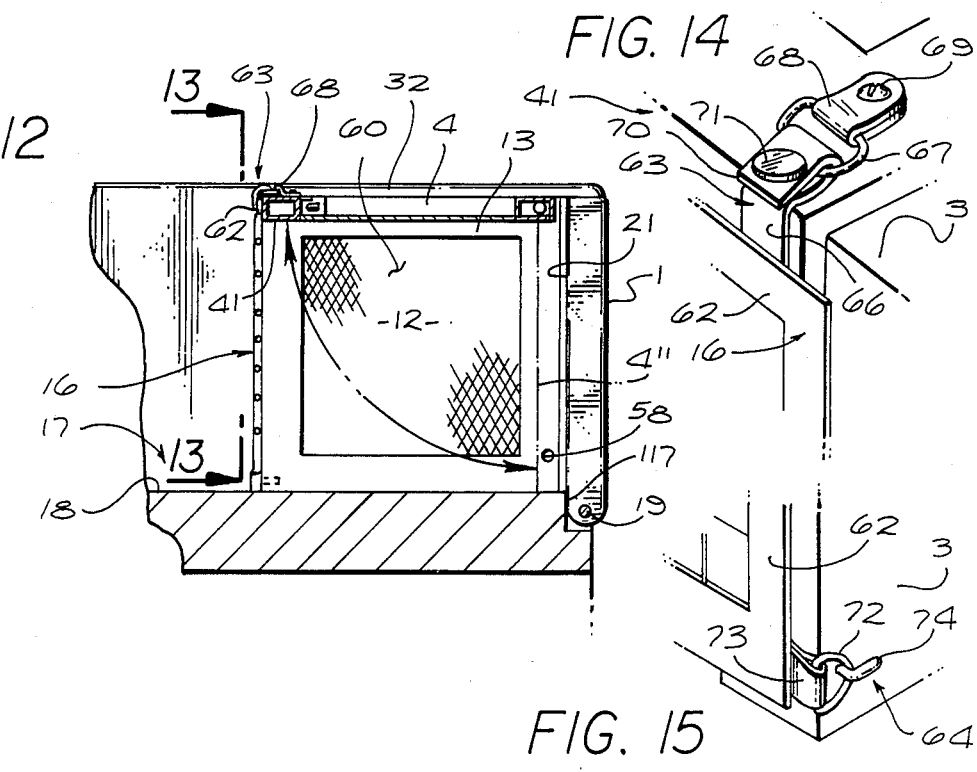

EXTENDABLE VEHICLE TAILGATE ASSEMBLY

This application is a continuation-in-part of U.S. patent application Ser. No. 932,629 filed Nov. 20, 1986, now abandoned, by Randy Palmer on "Extended Truck Bed".

This invention relates to improved tailgate assemblies to be utilized on trucks or other vehicles, for the purpose of increasing the effective length of the vehicle and the size of load which it can carry.

BACKGROUND OF THE INVENTION

In transporting items in a truck or other vehicle of the type having a tailgate at the rear of a load supporting bed mounted to swing between open and closed positions, it frequently happens that one or more of the items to be transported is somewhat longer than the space available on the truck bed when the tailgate is in its upwardly projecting closed condition. For example, lumber or other building materials may be longer than the truck bed and present a transportation problem. A solution may be to leave the tailgate in an open condition, extending rearwardly or downwardly at the back of the truck, so that the extra length items can project rearwardly beyond the bed. However, the tailgate does not then serve its intended function of confining the load items on the truck and against rearward displacement relative to the bed, and consequently the load must in some other way be tied, strapped, or otherwise secured tightly in place to prevent dangerous rearward shifting or perhaps complete loss of the load under the vibrational and other forces which occur during transportion.

To overcome this problem and increase the versatility and load carrying capacity of trucks and other vehicles of the discussed type, there have in the past been proposed arrangements for providing a second or auxiliary tailgate in an extended length condition of such a vehicle. For example, U.S. Pat. No. 4,531,773 issued July 30, 1985 to Gareth J. Smith on "Vehicle Tailgate Extension Assembly" shows a device adapted to be attached to the tailgate of a vehicle and which includes an auxiliary tailgate and two side panels hinged thereto in a manner allowing the entire assembly to be opened to a condition extending the effective length of the truck bed or folded to a collapsed condition for normal use of the truck. U.S. Pat. No. 4,472,639 issued Sept. 18, 1984 to Barry E. Bianchi on "Tailgate Attachment For Extending The Cargo Space Of Vehicles" shows a similar collapsible arrangement including an extra tailgate and side panels hinged to the extra tailgate for collapsing or folding movement.

SUMMARY OF THE INVENTION

The present invention provides an extendable tailgate assembly which serves a purpose similar to the devices of the above discussed prior patents, in allowing conversion of a truck or other vehicle between normal and extended length conditions, but which can be converted between those conditions much more easily and quickly than the devices shown in the patents. Further, an assembly constructed in accordance with the invention can have substantially greater strength and rigidity, and better load retaining characteristics, than the prior art devices in the extended length condition of the truck and its auxiliary tailgate. When the main tailgate is in its closed position, the auxiliary tailgate may in one condition be positioned above and parallel to the truck bed in a manner forming a storage compartment for receiving and confining items to be transported in the truck. When not needed as either an extension assembly or a storage compartment, the parts of the device can be converted to a completely inactive condition adjacent the main tailgate, in which the truck bed is substantially unobstructed and has essentially the same load carrying capacity and effective size which it would normally have in the absence of the conversion assembly.

A conversion assembly embodying the invention includes two side panels adapted to be attached to the main tailgate in positions generally parallel to one another and for swinging movement in that parallel condition with the main tailgate between its open and closed positions. In the open position of the main tailgate, the side panels project upwardly from that main tailgate at a location rearwardly beyond the side walls of the truck bed, and in the closed position of the main tailgate the side panels project forwardly adjacent those side walls of the truck and preferably essentially parallel thereto. The auxiliary tailgate is connected to the main tailgate for swinging movement relative thereto and relative to the side panels, while those side panels remain in their generally parallel relation with respect to one another, and from an active position of the auxiliary tailgate essentially perpendicular to the main tailgate to a retracted position essentially parallel to and essentially adjacent the main tailgate. The side panels are desirably attached rigidly to the tailgate to remain in fixed positions relative thereto and parallel to one another as the main tailgate swings between its closed and open conditions. By virtue of this rigid connection of the side panels to the main tailgate, those panels can very effectively retain load items within the extended truck bed in the extended condition of the tailgate assembly.

The auxiliary or second tailgate may be mounted for its swinging movement relative to the main tailgate and side panels by pivotal connections between the auxiliary tailgate and those side panels. Also, detenting means may be provided for releasably retaining the auxiliary tailgate in its different positions. To provide the previously mentioned storage compartment, the auxiliary tailgate may be capable of remaining in an active position of projection essentially perpendicular to the main tailgate as the main tailgate swings to its closed position, so that in that position of the main tailgate the auxiliary tailgate projects forwardly at a location spaced above the vehicle bed to provide the desired storage compartement vertically between the auxiliary tailgate and bed. A structure may be provided for extension across the front of this compartment, desirably in the form of a flexible net or mesh connected to edges of th auxiliary tailgate and side panels.

To allow for free flow of air through the auxiliary tailgate assembly in its extended length condition, the auxiliary tailgate and the side panels may be formed of an open type material, such as expended metal, allowing relatively unobstructed flow of air therethrough in response to movement of the vehicle.

BRIEF DESCRIPTION OF THE DRAWINGS

The above and other features and objects of the invention will be better understood from the following detailed description of the typical embodiment illustrated in the accompanying drawings, in which:

FIG. 1 is a side elevational view of the rear portion of a pick-up truck or other vehicle having a tailgate assembly embodying the present invention, and showing the extended or auxiliary tailgate in its up or closed position;

FIG. 2 is an end elevational view of the truck and tailgate assembly as seen from the rear of the truck and taken on line 2—2 of FIG. 1 and showing the extended or auxiliary tailgate in the up position;

FIG. 3 is a side view similar to FIG. 1, but showing the extended or auxiliary tailgate in its lowered or open position;

FIG. 4 illustrates the auxiliary or extended tailgate locking mechanism, and constitutes an enlarged fragmentary representation of a portion of FIG. 2;

FIG. 5 is an elevational view of the extended or auxiliary tailgate hinge at one side of the vehicle, and constitutes an enlargement of a portion of FIG. 2;

FIG. 6 is a side elevational view of the truck with the extended or auxiliary tailgate in a stored position forming a storage compartment above the rear portion of the truck bed, and with the truck's normal or main tailgate in its up or closed condition;

FIG. 7 is a top plan view showing the extended or auxiliary tailgate in its open position, taken on line 7—7 of FIG. 3;

FIG. 8 is a top view of the auziliary or extended tailgate in a stored position with the truck's normal or main tailgate up or closed and the auxiliary or extended tailgate swung down adjacent the main tailgate;

FIG. 9 is a top plan view taken on line 9—9 of FIG. 6 and showing the principle tailgate in its up or closed condition and the auziliary tailgate projecting forwardly therefrom to form a storage compartment;

FIG. 10 is an enlarged vertical section taken on line 10—10 of FIG. 2;

FIG. 11 is a vertical section taken on line 11—11 of FIG. 10;

FIG. 12 is an enlarged vertical section taken on line 12—12 of FIG. 9;

FIG. 13 is a reduced scale view taken on line 13—13 of FIG. 12; and

FIGS. 14 and 15 are enlarged fragmentary perspective views of the parts enclosed within the circle identified by the numbers 14 and 15 respectively of FIG. 13.

DESCRIPTION OF THE PREFERRED EMBODIMENT

Referring to FIGS. 1, 2, and 3, the extended tailgate assembly of the present invention is an assembly attached to the existing tailgate 1 of a truck. The device enables the floor bed to be extended for loads longer than the previous floor bed and supported by the extended or auxiliary tailgate 4. When stored in the open or up position, the unit provides a storage unit for loose tools and materials.

The extended or auxiliary tailgate assembly 4 is mounted by attaching it by separate brackets or by integrating brackets formed as part of right and left extended side supports or panels 3 and 13. The use of bolts 14 has proven satisfactory. The preferred embodiment has a hinge mechanism 7 attaching the extended tailgate 4 to the base of the extended side supports or panels 3 and 13. On the upper part of the right and left extended side supports 3 and 13 two holes, one each, are placed to secure the locking device 6. By disengaging the locking devices 6, the extended tailgate 4 may be lowered until stopped by the extended tailgate support mechanism 5-15 which prevents further descent. The locking mechanism 6 and hinge assembly 7 are shown in greater detail in FIGS. 4 and 5. The truck body 9 is included for reference. The right and left extended side supports or panels 3 and 13 and the extended tailgate's (4) side material 12 and 8 may be made of material that allows wind to pass through the right and left side supports 3 and 13 and extended tailgate 4.

When the extended tailgate assembly 4 is in the raised position as shown in FIGS. 1 and 2, the extended tailgate 4 is locked in position by the locking mechanism 6. The existing truck sides 9a and existing tailgate support 2 are shown for reference.

FIG. 6 shows the device in the raised or stored position. A mesh or additional support 16 (FIGS. 12 and 13) is attached to the extended tailgate 4 and right and left extended side supports or panels 3 and 13 to create a storage assembly to contain equipment and tools. As shown in FIGS. 6, 8, 9 and 12, when the main tailgate 1 is in its up or closed position the extended tailgate 4 may be in either its position of FIGS. 6, 9 and 12 where the gate 4 is 'up' relative to the principle tailgate, or with the extended or auxiliary gate 4 down as shown in FIG. 8. The extended tailgate 4 may be lowered and locked to the right and left extended side supports or panels 3 and 13 to return the truck to its normal full bed capaciaty as shown in FIG. 8.

The device may be made of plastic, iron, steel, aluminum or any other convenient materials. The material may be tubular or extruded channels with the side material 8-12 being that of metal or plastic and either sold or mesh. The preferred embodiment uses flexible netting 16 attached to the extended or auxiliary tailgate 4 and right and left side supports or panels 3 and 13 to form the storage box when in the position of FIGS. 6, 9 and 12 to form a storage compartment. The device may be made of many different sizes and material and will still meet the objective of the invention.

The truck to which the tailgate assembly of the present invention is attached may be a conventional pickup truck whose body 9 has a bed 17 with a horizontal upper surface 18 on which load items to be transported are positioned. The two side walls 9a of the truck body project upwardly at opposite sides of bed 17 and are parallel to one another and parallel to and spaced equal distances from a central vertical plane C extending in a front to rear direction relative to the vehicle. The main tailgate 1 of the vehicle is connected in the usual manner at its opposite ends by hinges 19 to the body 9 of the truck for swinging movement about a horizontal axis 20 extending parallel to the rear transverse edge 117 of truck bed 17 between the open or lowered position of FIGS. 1 to 5, 7, 10 and 11 and the closed position of the other Figures. In the FIG. 10 position of tailgate 1, its upper essentially planar surface 21 extends horizontally in alignment with the upper horizontal surface 18 of truck bed 17, and forms in effect a rearward continuation of that truck bed surface. In the FIG. 12 upwardly projecting essentially vertical condition of main tailgate 1, surface 21 extends vertically to form a back wall of the load carrying compartment within the truck body. Articulated brace assemblies 22 connect opposite ends of the main tailgate 1 to the two side walls 9a of the truck body, and act to support the main tailgate in its open FIG. 10 rearwardly projecting position. As will be understood, each brace assembly 22 may include two links 23 and 24 pivoted to the main tailgate 1 and a corresponding side wall of the truck body respectively at 25 and 26, and pivotally connected together at 27, to form an inclined supporting brace in the FIG. 10 condition which folds to a retracted condition in the FIG. 12 position. Appropriate conventional latch elements represented at 28 act to releasably hold the tailgate 1 in its FIG. 12 closed upwardly projecting position.

Since the two side panels 3 and 13 are essentially identical in construction, it will suffice to illustrate and describe in detail only one of these panels (see showing of panel 13 in FIGS. 10, 11, and 12). With reference particularly to FIG. 10, it is seen that panel 13 has a rectangular and preferably square rigid frame 29, with two parallel side members 30 and 31 projecting vertically in the FIG. 10 condition of the device, and two parallel top and bottom members 32 and 33 extending horizontally in that FIG. 10 position. These frame members 30, 31, 32 and 33, which form the four sides of the square frame 29 of panel 13, may be constructed of any appropriate material, preferably metal tubing of rectangular cross-section. Within the interior of the square 29, an apertured screen 12 is provided, to allow relatively free flow of air through the panel 13. This screen 12 is preferably formed of expanded metal, such as expanded steel, stamped to provide a large number of air passing apertures distributed across the entire area of the screen. The expanded metal has sufficient strength and rigidity to effectively retain its shape and to confine load units against lateral displacement. The screen may be held in place by peripherally welding it to the inner edges of the four frame members, 30, 31, 32 and 33.

In the FIG. 10 open position of the main tailgate 1, the forward vertical frame member 30 of side panel 13 is received closely adjacent the rear vertical edge 36 of the side wall 9a of the truck body, but is spaced laterally inwardly a short distance with respect to the inner surface 37 of that side wall (FIG. 11). Surface 37 is parallel to the main front to rear central plane C of the truck body, and frame 29 of panel 13 lies essentially in a plane 39 which is also parallel to plane C and to surface 37 so that as main tailgate 1 swings upwardly and forwardly from its FIG. 10 position to its FIG. 12 position, the side panel 13 which is rigidly attached to tailgate 1 swings with it to a location closely adjacent and laterally inwardly of the corresponding side wall 9a of the truck body. Similarly, the second auxiliary side panel 3 at the opposite side of the truck body is parallel to panel 13 and to the side walls 9a of the truck body and central front to rear plane C, and swings to a position closely adjacent and spaced slightly inwardly of and parallel to the inner surface of the second side wall 9a of the truck body. The central plane 38 of the second auxiliary side panel 3 is parallel to the central plane 39 of the first side panel and to plane 18, and all of these planes are of course perpendicular to the main hinge axis 20 about which tailgate 1 swings.

The two auxiliary side panels 3 and 13 are rigidly attached to main tailgate 1 by flat flanges or plates 40 (FIGS. 10 and 11) welded or otherwise rigidly secured to the lower edges of the bottom frame members 33 of panels 3 and 13. These flanges or plates 40 extend horizontally adjacent the planar upper surface 21 of tailgate 1 in the FIG. 10 position of the tailgate, and are secured rigidly thereto by bolts 14, to thus permanently hold panels 3 and 13 in fixed positions relative to tailgate 1.

The auxiliary tailgate 4 functions as an upwardly projecting closed tailgate with respect to side panels 3 and 13 in the FIG. 10 condition of the apparatus, and in that condition extends transversely of the vehicle between the rear frame members 31 of panels 3 and 13. As seen in FIGS. 2 and 7, tailgate 4 is of rectangular configuration, including a rigid frame 41 defined by two elongated parallel frame members 42 and 43 extending transversely of the vehicle and perpendicular to plane C, and two opposite side frame members 44 and 45 extending perpendicular to members 42 and 43. An apertured screen 8 extends across the space within the interior of this frame, and preferably takes the form of expanded metal of the type referred to in connection with side panels 3 and 13, having sufficient rigidity to effectively confine load items on the truck, and having sufficient air passing capacity to allow relatively free flow of air through tailgate 4 in the FIG. 2 upstanding position of that tailgate, to thereby minimize aerodynamic resistance to travel of the vehicle. The four rigid members 42, 43, 44 and 45 defining the frame 41 of the auxiliary tailgate may take any convenient form, but preferably are constructed of hollow tubular material desirably of rectangular cross-section as seen in FIG. 10.

Tailgate 4 is connected pivotally to side panels 3 and 13 by the hinge mechanisms 7, which as seen in FIGS. 5 and 11 preferably take the form of two aligned horizontally extending cylindrical pivot pins 46, rigidly secured to frame 41 as by welding at 47, and projecting laterally into openings 48 in the rear members 31 of frames 29 of the two side panels 3 and 13 respectively. Pins 46 extend along a horizontal axis 49 which is parallel to the main pivotal axis 20 about which main tailgate 1 swings, to thus mount the auxiliary tailgate 4 for swinging movement relative to the main tailgate about axis 49. This pivotal connection effected by pins 46 also of course requires swinging movement of those pins and the pivotal axis 49 with tailgate 1 as tailgate 1 swings between its open and closed positions.

Auxiliary tailgate 4 swings about axis 49 through 180 degrees, between the rearwardly projecting open position of the auxiliary tailgate represented in broken lines at 4' in FIG. 10, and the fully retracted position represented in broken lines at 4" in that Figure. More particularly, the auxiliary tailgate can swing upwardly and forwardly from the position 4' through the upstanding full line position and then through another 90 degrees to the retracted position 4".

Tailgate 4 is releasably retainable in either the full line upstanding position of FIG. 10 or the fully retracted broken line position 4" adjacent main tailgate 1 by the previously mentioned locking devices 6 at opposite ends of tailgate 4. These locking devices may be identical, and consequently only one has been illustrated in detail in FIGS. 10 and 11. As seen in that figure, each of the locking devices may include a latch pin 48, having an externally cylindrical portion 49 forming a rod extending along a horizontal axis 50 parallel to axes 20 and 49, and mounted for longitudinal movement along axis 50 by slidable reception within guideway passages and openings 51 formed in frame 41 of the auxiliary tailgate, and formed also in a rigid block 52 welded or otherwise secured to frame 41. In the FIG. 11 position of the parts, the extremity of portion 49 of latch element 49 is received and confined within a tubular bushing 53 attached rigidly to frame 29 of side panel 13, to releasably hold the auxiliary tailgate it its upstanding position relative to the side panel. Bushing 53 may be received within an opening 54 in the frame of the side panel, and be welded or otherwise permanently attached to that frame. The latch element 48 is yieldingly urged rightwardly to its holding position as viewed in FIG. 11 by a spring 55 contained and confined within block 52. The end 56 of latch element 48 may be turned perpendicular to the main cylindrical portion 49 of the latch element to function as a handle and as a lug for releasably holding the latch element in its retracted position out of engagement with bushing 53 as represented in broken lines in FIGS. 10 and 11. When handle 56 is pulled leftwardly in FIG. 11 to its broken line position 56', and is turned through 90 degrees about axis 50, handle 56 can then engage a member 57 which is welded to and projects downwardly from the upper member 42 of frame 41 of the auxiliary tailgate, to hold the latch element in released condition. If both latches at opposite ends of the tailgate are thus retracted, the auxiliary tailgate is then free to swing between its three different positions illustrated in FIG. 10. In the completely retracted position of the auxiliary tailgate represented at 4" in FIG. 10, and illustrated also at 4" in FIG. 12, the two latch elements can engage two additional bushings 58 carried by the frames of side panels 3 and 13 respectively, to thus releasably hold the auxiliary tailgate in that retracted position adjacent and parallel to the main tailgate 1. In the second broken line position of tailgate 4 as represented at 4' in FIG. 10, the auxiliary tailgate is supported in horizontal rearwardly projecting condition, approximately aligned horizontally with the main tailgate 1, by the tailgate supports 2 at opposite sides of the vehicle. These supports 2 preferably take the form of flexible cables as seen in FIG. 10, each connected at its opposite ends 58 and 59 to the auxiliary tailgate 4 and one of the side panels 3 or 13. As seen in FIG. 11, sufficient clearance may be provided between the auxiliary tailgate and the side panels to allow reception of cables 2 therebetween as the auxiliary tailgate swings through 180 degrees relative to the side panels between the two broken line positions of FIG. 10.

FIG. 12 represents a condition of the apparatus in which the main tailgate 1 of the vehicle is in its upwardly projecting closed condition, and the auxiliary tailgate 4 is still retained as in FIG. 11 in a position projecting perpendicular to main tailgate 1. Thus, as the main tailgate swings upwardly and forwardly from its open position of FIGS. 10 and 11 to its closed position of FIG. 12, the auxiliary tailgate 4 swings from a vertically extending condition to the FIG. 12 position in which it projects forwardly, still perpendicular to the main tailgate, and in a horizontal condition parallel to and spaced above the horizontal bed 17 of the truck body, to define an essentially rectangular storage compartment 60 in the truck forwardly of tailgate 1. This compartment extends vertically between auxiliary tailgate 4 and the truck bed, and extends laterally between the opposite side panels 3 and 13 still carried by tailgate 1. The front of compartment 60 may be closed by the previously mentioned element 16, preferably taking the form of a flexible mesh or net capable of retaining load items within compartment 60 but also adapted for flow of air through the net. This net is rectangular and of a size to extend entirely across the rectangular opening formed at the front of compartment 60, as seen in FIG. 13.

Net 16 may have a rectangular cloth binding tape 62 extending rectangularly along its periphery and along the perimeter of the front side of compartment 60. Along the upper edge of the net, the binding tape is received adjacent and is detachably connectable at spaced locations to member 41 of auxiliary tailgate 4 by fastener assemblies 63 (FIG. 14). At the opposite ends of the net, the binding tape 62 extends vertically along and is detachably connectable to members 32 of the frames of side panels 3 and 13 by fastener assemblies 64 (see FIG. 15). At the bottom of the net, binding tape 64 extends horizontally adjacent the upper surface of the truck bed 17. Preferably, this lower extent of the binding tape 62 has a central portion 65 (FIG. 13) containing an elastic cord which yieldingly tends to reduce the length of the lower run of the binding tape at the bottom of the net and thus maintains the net in taut condition between the opposite side panels.

Referring more particularly to FIG. 14, each of the upper net connecting assemblies 63 may include a flexible strap 66 of cloth or the like adapted to be passed through a metal loop or ring 67 which is secured by a strap 68 to the surface of member 41 which faces upwardly in the FIG. 12 position of the auxiliary tailgate 4. Strap 68 may be attached to member 41 by a rivet, screw, or other fastener represented at 69. The strap 66 has a free end 70 which can be passed through loop 67 and then doubled back for attachment to another portion of strap 66 by a snap fastener 71.

The detachable connections 64 between the lower portions of the net at its opposite ends and side panels 3 and 13 may each include a metal loop or ring 72 secured permanently by a flexible strap 73 to a portion of the peripheral binding tape 62 of the net. A hook shaped part 74 projects laterally outwardly from a lower end of member 32 of each of the side panels 3 and 13, so that the loop 32 may be detachably connected to the hook 74 in the manner seen in FIG. 15. The central elastic portion 65 of the lower part of the net maintains the two loops 72 at opposite ends of the net tightly in engagement with the rigid hooks 74 attached to the side panels, to thus securely hold the net in place.

To now recapitulate briefly the various different conditions in which the tailgate assembly of the present invention can be utilized, assume first of all that the main tailgate 1 of the truck is in its open rearwardly projecting position of FIGS. 1, 2, 10 and 11, and assume that the auxiliary tailgate 4 is in its upwardly projecting closed position of those figures and is retained in that position by engagement of latch elements 48 with bushings 53 carried by the side panels. In this condition, the horizontally projecting main tailgate 1 forms in effect a rearward continuation of the bed 17 of the truck body, while side panels 3 and 13 form rearward continuations of the side walls 9a of the truck body, and auxiliary tailgate 4 forms a closed tailgate at the back of the main tailgate 1. Thus, the effective length of the truck body has been increased, and the back of the truck is still closed by a tailgate. During loading, latch elements 48 can be released, to permit swinging movement of auxiliary tailgate 4 to the rearwardly projecting broken link position represented at 4' in FIG. 10, so that materials can be loaded onto the truck bed from the rear past and over horizontal auxiliary tailgate 4' and horizontal main tailgate 1. If the materials loaded are too long for reception within the truck when tailgate 4 is in the full line position of FIG. 10, that tailgate may be left in its horizontal rearwardly projecting position during transportation.

If it is desired to reduce the length of the truck to its normal condition while providing a storage compartment in the back of the truck, tailgate 1 is swung to its FIG. 12 position while the auxiliary tailgate 4 remains perpendicular to tailgate 1, to provide the compartment 60 within which groceries, tools, or other load items can be carried. The flexible net 16 can then be connected to the auxiliary tailgate and the side panels as discussed to close that compartment if desired. When it becomes desirable to retract the assembly to its FIG. 8 condition, main tailgate 1 is swung to its upwardly projecting closed position and latched in that condition, and auxiliary tailgate 4 is swung to its broken line position 4″ of FIG. 12 adjacent and parallel to surface 21 of main tailgate 1. In that condition, the tailgate 1 projects upwardly as seen in FIG. 12, and the auxiliary tailgate 4 hangs downwardly in front of and closely adjacent tailgate 1 as represented at 4″ in FIG. 12, leaving substantially the entire normal area of the truck bed unobstructed and accessible for reception of load items.

While certain specific embodiments of the present invention have been disclosed as typical, the invention is of course not limited to this particular form, but rather is applicable broadly to all such variations as fall within the scope of the appended claims.

I claim:

1. An extension for a vehicle having a bed, two side walls, and a main tailgate which swings between an upstanding closed position and a rearwardly projecting open position, comprising:

two side panels adapted to be attached to said main tailgate in positions generally parallel to one another and for swinging movement with the main tailgate, and which in said open position of the main tailgate project upwardly therefrom rearwardly beyond said side walls of the vehicle, and in said closed position of the main tailgate project forwardly adjacent said side walls of the vehicle;

an auxiliary tailgate; and hinge means for mounting said auxiliary tailgate for swinging movement relative to said main tailgate and relative to said side panels, while said side panels remain generally parallel to one another, and from an active position of said auxiliary tailgate essentially perpendicular to said main tailgate to a retracted position essentially parallel to and essentially adjacent said main tailgate.

2. An extension for a vehicle as recited in claim 1, including means for attaching said two side panels to said main tailgate essentially rigidly in said positions generally parallel to one another.

3. An extension for a vehicle as recited in claim 1, including flanges formed on said two side panels and adapted to be received adjacent and be secured rigidly to said main tailgate to attach the side panels to the main tailgate in said positions generally parallel to one another.

4. An extension for a vehicle as recited in claim 1, including flanges formed on said two side panels to be received adjacent said main tailgate, and fasteners for securing said flanges rigidly to said main tailgate to retain the side panels in said positions generally parallel to one another.

5. An extension for a vehicle as recited in claim 1, including holding means for releasably retaining said auxiliary tailgate in said active position relative to said main tailgate and projecting essentially perpendicular thereto.

6. An extension for a vehicle as recited in claim 1, including holding means for releasably retaining said auxiliary tailgate in said retracted position relative to said main tailgate and essentially parallel thereto.

7. An extension for a vehicle as recited in claim 1, including holding means for releasably retaining said auxiliary tailgate in said active position and in said retracted position relative to said main tailgate.

8. An extension for a vehicle as recited in claim 1, in which said hinge means mounts said auxiliary tailgate for swinging movement through approximately one hundred and eighty degrees relative to said main tailgate and from said retracted position through said active position and then approximately ninety degrees beyond said active position to a rearwardly projecting open condition of the auxiliary tailgate.

9. An extension for a vehicle as recited in claim 8, including means for limiting swinging movement of said auxiliary tailgate relative to said main tailgate in said open condition of the auxiliary tailgate with the auxiliary and main tailgates essentially aligned horizontally with one another.

10. An extension for a vehicle as recited in claim 8, including cables extending between said side panels and said auxiliary tailgate for limiting swinging movement of said auxiliary tailgate relative to the main tailgate and said side panels in said open condition of the auxiliary tailgate.

11. An extension for a vehicle as recited in claim 1, in which said hinge means attach opposite ends of said auxiliary tailgate pivotally to said two side panels respectively for said swinging movement of the auxiliary tailgate.

12. An extension for a vehicle as recited in claim 1, in which said hinge means include two axially aligned hinge pins connecting opposite ends of said auxiliary tailgate pivotally to said two side panels respectively for said swinging movement of the auxiliary tailgate.

13. An extension for a vehicle as recited in claim 1, in which said auxiliary tailgate is open to flow of air therethrough.

14. An extension for a vehicle as recited in claim 1, in which said two side panels are open to flow of air therethrough.

15. An extension for a vehicle as recited in claim 1, in which said auxiliary tailgate is adapted, when the main tailgate is in said closed position thereof, to be in either said retracted position relative to the main tailgate, esssentially parallel to and essentially adjacent said main tailgate, or in said active position reltive to the main tailgate and projecting forwardly therefrom at a location spaced above said bed of the vehicle to form a storage compartment vertically between the auxiliary tailgate and vehicle bed.

16. An extension for a vehicle as recited in claim 15, including Am a structure adapted to extend across a forward side of said compartment when the main tailgate is in its closed position and said auxiliary tailgate is in said forwardly projecting active position.

17. An extension for a vehicle as recited in claim 15, including a net adapted to extend generally vertically across a forward side of said compartment between said side panels and between said auxiliary tailgate and said vehicle bed.

18. An extension for a vehicle as recited in claim 15, including a net adapted to be attached to forward edges of said auxiliary tailgate and said two side panels, when said main tailgate is in said closed position and said auxiliary tailgate is in said active position, to extend generally vertically downwardly across a forward side of said compartment.

19. An extension for a vehicle as recited in claim 1, including spring pressed detent means for releasably retaining said auxiliary tailgate in said active position and in said retracted position relative to said main tailgate.

20. An extension for a vehicle as recited in claim 1, including spring pressed latch elements carried by opposite ends of said auxiliary tailgate, and sockets formed in said two side panels at locations offset ninety degrees from one another about the hinge axis of said auxiliary tailgate and adapted for engagement with said latch elements to releasably retain said auxiliary tailgate in either said active position or said retracted position.

21. An extension for a vehicle having a bed, two side walls, and a main tailgate which swings between an upstanding closed position and a rearwardly projecting open position, comprising:
   two side panels;
   flanges on said side panels adapted to be attached rigidly to said main tailgate to secure said two side panels rigidly to opposite ends of said main tailgate in positions generally parallel to one another and for swinging movement with the main tailgate;
   said side panels in said open position of the main tailgate projecting upwardly therefrom at a location rearwardly beyond said side walls of the vehicle, and in said closed position of the main tailgate projecting forwardly adjacent said side walls of the vehicle;
   an auxiliary tailgate;
   hinges at opposite ends of said auxiliary tailgate for pivotally attaching the auxiliary tailgate to said two side panels for swinging movement relative to the side panels and relative to the main tailgate, while the side panels remain rigidly attached to the main tailgate and generally parallel to one another, and through approximately one hundred and eighty degrees from a retracted position of the auxiliary tailgate essentially parallel to and essentially adjacent the main tailgate through an active position projecting essentially perpendicular to the main tailgate and to an open position of the auxiliary tailgate in which the auxiliary tailgate and main tailgate are essentially aligned with one another; and
   interengageable latch means on said auxiliary tailgate and said two side panels operable to releasably retain said auxiliary tailgate in said active position projecting perpendicular to the main tailgate and in said retracted position essentially parallel to and essentially adjacent the main tailgate.

22. An extension for a vehicle as recited in claim 21, in which said auxiliary tailgate is adapted to be received in said retracted position or said active position or said open position when the main tailgate is in its open position, and said auxiliary tailgate is adapted, when the main tailgate is in its closed position, to be releasably retained in either said retracted position of the auxiliary tailgate for reception adjacent the main tailgate, or said active position of the auxiliary tailgate to project forwardly at a location spaced above the vehicle bed and between the two side panels to form a compartment vertically between the auxiliary tailgate and vehicle bed.

23. An extension for a vehicle as recited in claim 22, including a net connected to forward edges of said auxiliary tailgate and said side panels when the main tailgate is in said closed position and said auxiliary tailgate is in its active position, to extend across a forward side of said compartment.

24. An extension for a vehicle as recited in claim 23, including cables extending between said side panels and said auxiliary tailgate for limiting swinging movement of the auxiliary tailgate in said open position thereof relative to the main tailgate and side panels.

25. A vehicle comprising:
   a bed;
   two side walls;
   a main tailgate which swings between an upstanding closed position and a rearwardly projecting open position;
   two side panels attached to said main tailgate in positions generally parallel to one another and for swinging movement with the main tailgate, and which in said open position of the main tailgate project upwardly therefrom rearwardly beyond said side walls, and in said closed position of the main tailgate project forwardly adjacent said side walls;
   an auxiliary tailgate; and
   hinge means mounting said auxiliary tailgate for swinging movement relative to said main tailgate and relative to said side panels, while said side panels remain generally parallel to one another, and from an active position of said auxiliary tailgate essentially perpendicular to said main tailgate to a retracted position essentially parallel to and essentially adjacent said main tailgate.

26. A vehicle as recited in claim 25, including latch means for releasably retaining said auxiliary tailgate in said active position and in said retracted position relative to said main tailgate.

27. A vehicle as recited in claim 25, in which said hinge means mount said auxiliary tailgate for swinging movement through approximately one hundred and eighty degrees relative to said main tailgate and side panels, from said retracted position through said active position and then approximately ninety degrees beyond said active position to an open position of the auxiliary tailgate generally aligned with said main tailgate.

28. A vehicle as recited in claim 25, in which said auxiliary tailgate is adapted to be received in said active position relative to said main tailgate when the main tailgate is in said closed position thereof, to form a compartment forwardly of the main tailgate and vertically between said auxiliary tailgate and said vehicle bed.

29. A vehicle as recited in claim 28, including a net adapted to extend downwardly from a forward edge of said auxiliary tailgate across a forward side of said compartment when the auxiliary tailgate is in its active position and said main tailgate is in its closed position.

30. A vehicle as recited in claim 29, in which said hinge means mount said auxiliary tailgate for swinging movement through approximately one hundred and eighty degrees when the main tailgate is in its open position, to move the auxiliary tailgate from said retracted position through said active position and to an open position of the auxiliary tailgate essentially aligned with the main tailgate, there being brace means connected between said side panels and said auxiliary tailgate for limiting swinging movement of the auxiliary tailgate in said open position thereof.

31. An extension for a vehicle having a bed, two side walls, and a main tailgate which swings between an upstanding closed position and a rearwardly projecting open position, comprising:
   an auxiliary tailgate;
   means for mounting said auxiliary tailgate to said main tailgate with the auxiliary tailgate projecting generally perpendicular to said main tailgate, so that when the main tailgate is in its open rearwardly projecting position the auxiliary tailgate projects upwardly near the rear of the main tailgate, and when said main tailgate is in its upstanding closed position said auxiliary tailgate projects forwardly therefrom at a location spaced above said bed of the vehicle to define a compartment vertically between the auxiliary tailgate and the vehicle bed and in front of said main tailgate.

32. An extension for a vehicle as recited in claim 31, including two side panels adapted to be carried by said main tailgate at opposite ends thereof and generally parallel to one another and adapted to swing with said main tailgate between said open and closed positions thereof and to project upwardly from the main tailgate in said open position and project forwardly at opposite sides of said compartment in said closed position of the main tailgate.

33. An extension for a vehicle as recited in claim 31, including a structure extending across a forward side of said compartment in said closed position of the main tailgate.

34. An extension for a vehicle as recited in claim 32, including a net carried by forward edges of said auxiliary tailgate and said two side panels in said closed position of the main tailgate to extend across a forward side of said compartment.

35. A vehicle comprising:
a bed;
two side walls;
a main tailgate which swings between an upstanding closed position and a rearwardly projecting open position;
an auxiliary tailgate; and
means mounting said auxiliary tailgate to said main tailgate with the auxiliary tailgate projecting generally perpendicular to said main tailgate, so that when the main tailgate is in its open rearwardly projecting position the auxiliary tailgate projects upwardly near the rear of the main tailgate, and when said main tailgate is in its upstanding closed position said auxiliary tailgate projects forwardly therefrom at a location spaced above said bed of the vehicle to define a compartment vertically between the auxiliary tailgate and the vehicle bed and in front of said main tailgate.

36. A vehicle as recited in claim 35, including two side panels carried by said main tailgate at opposite ends thereof and generally parallel to one another and adapted to swing with said main tailgate between said open and closed positions thereof and to project upwardly from the main tailgate in said open position and project forwardly at opposite ends of said compartment in said closed position of the main tailgate.

37. A vehicle as recited in claim 35, including a structure extending across a forward side of said compartment in said closed position of the main tailgate.

38. A vehicle as recited in claim 36, including a net carried by forward edges of said auxiliary tailgate and said two side panels in said closed position of the main tailgate to extend across a forward side of said compartment.

* * * * *